(12) United States Patent
Lee

(10) Patent No.: US 7,440,378 B2
(45) Date of Patent: Oct. 21, 2008

(54) INFORMATION STORAGE MEDIUM AND METHOD AND APPARATUS FOR RECORDING/REPRODUCING DATA

(75) Inventor: Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 10/875,686

(22) Filed: Jun. 25, 2004

(65) Prior Publication Data

US 2005/0030869 A1 Feb. 10, 2005

(30) Foreign Application Priority Data

Jun. 28, 2003 (KR) .................. 10-2003-0042997

(51) Int. Cl.
*G11B 5/09* (2006.01)

(52) U.S. Cl. .............. 369/53.31; 369/59.25; 369/53.22; 369/94

(58) Field of Classification Search ... 369/275.1–275.5, 369/30.03, 94, 53.21, 59.25, 53.31, 53.22, 369/47.22, 47.27, 53.44, 53.2, 44.39
See application file for complete search history.

(56) References Cited

U.S. PATENT DOCUMENTS

| 5,729,525 | A | 3/1998 | Ishida et al. |
| 5,881,032 | A | 3/1999 | Ito et al. |
| 6,317,408 | B1 | 11/2001 | Miyauchi et al. |

FOREIGN PATENT DOCUMENTS

| EP | 0908882 A2 | 4/1999 |
| JP | 11-053822 | 2/1999 |
| JP | 2001-243712 | 9/2001 |
| JP | 2003-263842 | 9/2003 |

*Primary Examiner*—Ali Neyzari
(74) *Attorney, Agent, or Firm*—Stein, McEwen & Bui, LLP

(57) ABSTRACT

A read-only information storage medium having one or more recording layers and a method and apparatus reading/reproducing data, the read-only information storage medium having one or more recording layers, each layer containing a lead-in area, a user data area, and a lead-out area. The locations of the lead-in and lead-out areas may be fixed, and when an amount of user data recorded on the storage medium is less than a full capacity of the storage medium, data other than the user data is recorded on a space remaining after the user data has been recorded.

21 Claims, 6 Drawing Sheets

INFORMATION STORAGE MEDIUM AND METHOD AND APPARATUS FOR RECORDING/REPRODUCING DATA

CROSS-REFERENCE TO RELATED APPLICATION

This application claims the benefit of Korean Patent Application No. 2003-42997, filed on Jun. 28, 2003, in the Korean Intellectual Property Office, the disclosure of which is incorporated herein by reference.

BACKGROUND OF THE INVENTION

1. Field of the Invention

The present invention relates to a read-only information storage medium having one or more recording layers in which the layout of each layer including a lead-in area, a user data area, and a lead-out area are designed to be consistent with other types of information storage media, and a method and apparatus recording/reproducing data on/from the read-only information storage medium.

2. Description of the Related Art

In general, an information storage medium is widely adopted as an information recording medium of an optical pickup system for non-contact type recording/playback. Optical disks, which are an example of information storage media, are classified into compact disks (CDs) and digital versatile disks (DVDs) depending on data recording capacity. Examples of optical disks enabling writing, erasing, and reading of information include 650 MB CD-Recordable (CD-R), CD-Rewritable (CD-RW), 4.7 GB DVD+RW, DVD-Random Access Memory (RAM), and DVD-R/RW. Furthermore, a High Definition-DVD (HD-DVD) with a recording capacity of over 20 GB is currently being developed.

Advances in information storage medium technology continue to result in increases in recording capacity. Representative approaches for increasing recording capacity include using a shorter wavelength light source, increasing a numerical aperture (NA) of an objective lens, and using a plurality of recording layers.

A DVD-ROM having a plurality of recording layers is disclosed in U.S. Pat. No. 5,881,032. FIG. 1A shows a sector address structure of a dual-layer disk disclosed in U.S. Pat. No. 5,881,032. First and second recording layers L1 and L2 on the disk include lead-in areas 1a and 2a, respectively, and lead-out areas 1b and 2b, respectively. A sector address X on the first recording layer L1 increases from an inner circumference Rin to an outer circumference Rout while a sector address X' on the second recording layer L2 increases from the outer circumference Rout to the inner circumference Rin.

A multi-layer optical disk with two or more recording layers has two different track modes, called opposite track path (OTP) and parallel track path (PTP), which differ in the direction of reading information recorded on the disk. As shown in FIG. 1B, in the OTP mode, the first recording layer L1 is read from the inner circumference Rin to the outer circumference Rout, and then the second recording layer L2 is read from the outer circumference Rout to the inner circumference Rin. In other words, OTP is where a track spiral runs in opposite directions on adjacent recording layers.

FIG. 1C shows an OTP multi-layer optical disk having first through fourth recording layers L1-L4. Here, while the first and third recording layers L1 and L3 contain lead-in areas 1a and 3a and lead-out areas 1b and 3b at the inner and outer circumferences Rin and Rout of the disk, respectively, the second and fourth recording layers L2 and L4 contain lead-out areas 2b and 4b and lead-in areas 2a and 4a at the inner and outer circumferences Rin and Rout of the disk, respectively. Thus, the first and third recording layers L1 and L3 are read from the inner circumference Rin to the outer circumference Rout while the second and fourth recording layers L2 and L4 are read from the outer circumference Rout to the inner circumference Rin.

FIG. 2 shows a PTP dual-layer optical disk. Information is read from the inner circumference Rin to the outer circumference Rout of the first recording layer L1, and then read from the inner circumference Rin to the outer circumference Rout of the second recording layer L2. In other words, in PTP mode, a track spiral on second recording layer L2 runs parallel to that on the first recording layer L1. Thus, the first and second recording layers L1 and L2 contain first and second lead-in areas 1a and 2a at the inner circumference of the disk and first and second lead-out areas 1b and 2b at the outer circumference, respectively.

The first through fourth lead-in areas 1a-4a and lead-out areas 1b-4b contain disk-related information. For a recordable disk, the first through fourth lead in and lead out area 1a through 4b also contain various recording conditions. Thus, the information recorded in the lead-in areas 1a-4a and lead-out areas 1b-4b must be read in order to properly record or read user data.

If the amount of information to be recorded on a multi-layer information storage medium as described above is less than the maximum amount of information that can be written to all of the multiple recording layers, there may be space left on at least one of the multiple recording layers. It is desirable to utilize such an unrecorded portion of a recording layer in a way that is consistent for various information storage media. FIGS. 3A and 3B show recordable single- and dual-layer information storage media where the locations or capacities of lead-in, lead-out, and user data areas are fixed.

As shown in FIG. 4, information is recorded on an entire data area of a first recording layer L1, and then on a portion of a data area of a second recording layer L2. Here, a beam may pass through a recorded portion L1R of the first recording layer L1 and an unrecorded portion L2N of the second recording layer L2, or pass through recorded portions L1R and L2R of both layers L1 and L2. Varying reading conditions for each recording layer irradiated by the beam may adversely affect reading performance.

Thus, there is a need to design the layout of a multi-layer information storage medium to be consistent with other types of media while maintaining optimal reading performance for multiple recording layers. cl SUMMARY OF THE INVENTION An aspect of the present invention provides an information storage medium in which layouts of a lead-in area, a user data area, and a lead-out area are defined when the amount of user data recorded is less than the medium's full capacity, and a method and apparatus recording/reproducing data on/from the information storage medium.

According to an aspect of the present invention, there is provided a read-only information storage medium having one or more recording layers, each layer containing a lead-in area, a user data area, and a lead-out area, wherein locations of the lead-in and lead-out areas are fixed, and when an amount of user data recorded on the storage medium is less than a full capacity of the storage medium, data other than the user data is recorded on a space remaining on the storage medium after the user data has been recorded.

According to an aspect of the invention, when the storage medium has multiple recording layers, data is sequentially recorded on the layers, and the remaining space is present on a recording layer that the user data is recorded on last.

According to an aspect of the invention, the data other than the user data that is recorded on the remaining space may be dummy data or information on a position where recording of the user data ends.

According to another aspect of the present invention, there is provided a read-only information storage medium having one or more recording layers, each layer containing a lead-in area, a user data area, and a lead-out area, wherein locations of the lead-in and lead-out areas are fixed, and when an amount of user data recorded on the storage medium is less than a full capacity of the storage medium, a space remaining after the user data has been recorded is maintained as a mirror region.

According to another aspect of the present invention, there is provided a read-only information storage medium having a plurality of recording layers, each layer containing a lead-in area, a user data area, and a lead-out area, wherein when an amount of user data recorded on the storage medium is less than a full capacity of the storage medium, the location of the lead-out area of a recording layer that the user data is recorded on last is variable while locations of the other lead-in and lead-out areas are fixed.

According to another aspect of the present invention, there is provided a method of recording/reproducing data on/from a read-only information storage medium having one or more recording layers, each layer containing a lead-in area, a user data area, and a lead-out area, the method includes fixing locations and capacities of the lead-in and lead-out areas and, when an amount of user data recorded on the storage medium is less than a full capacity of the storage medium, recording data other than the user data on a remaining space after the user data has been recorded or maintaining the remaining space as a mirror region.

According to another aspect of the present invention, there is provided an apparatus recording/reproducing data on/from a read-only information storage medium having one or more recording layers, each layer containing a lead-in area, a user data area, and a lead-out area, when the apparatus includes a pickup emitting a beam onto the information storage medium and receiving a beam reflected from the information storage medium, a recording/reproducing signal processor processing the beam reflected from the information storage medium through the pickup to perform signal processing, and a controller controlling the pickup to fix the locations and capacities of the lead-in and lead-out areas and, when an amount of user data recorded on the storage medium is less than a full capacity of the storage medium, to record data other than the user data on a remaining space after the user data has been recorded or maintain the remaining space as a mirror region.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

Figure 1A:
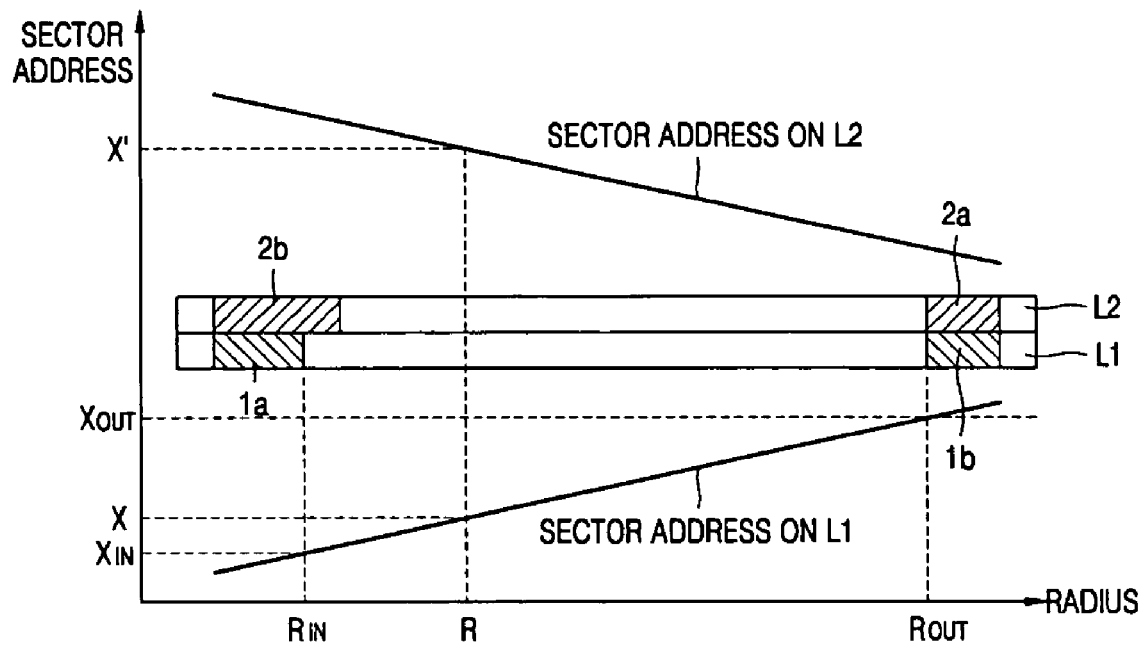
FIG. 1A shows a sector address structure of a conventional dual-layer DVD-ROM disk.
Figure 1B:
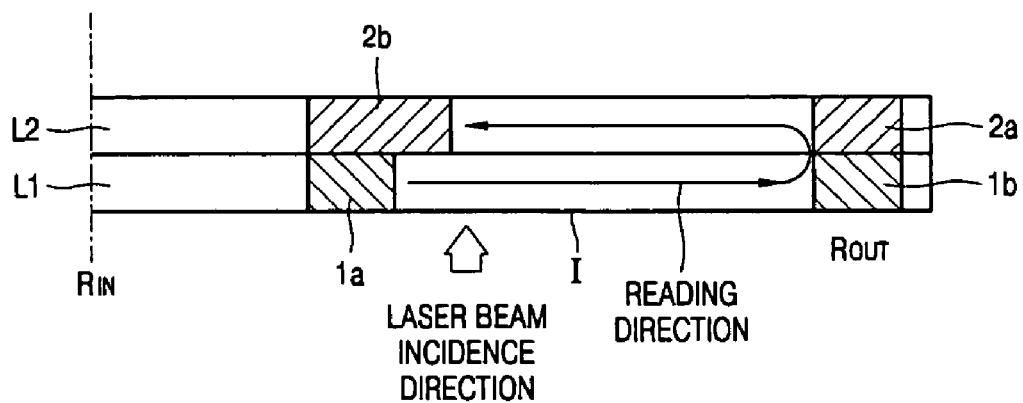
FIG. 1B shows the layout of a conventional Opposite Track Path (OTP) dual-layer DVD-ROM disk including lead-in and lead-out areas.
Figure 1C:
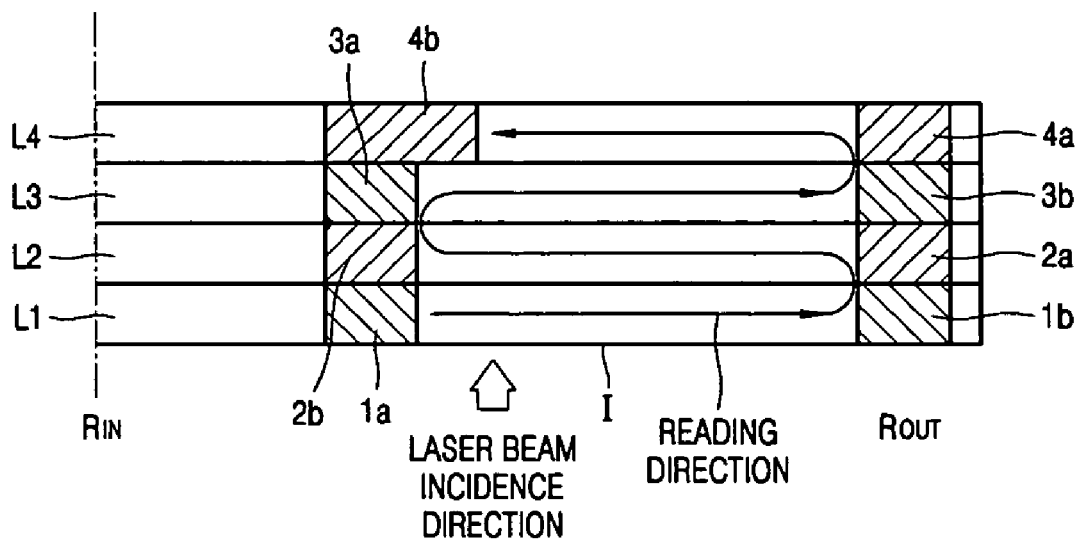
FIG. 1C shows a conventional OTP multi-layer optical disk having first through fourth recording layers.
Figure 2:
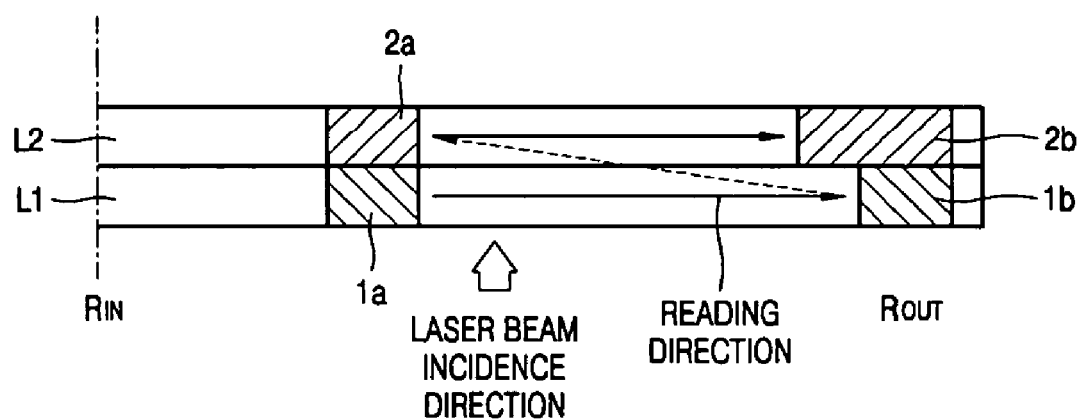
FIG. 2 shows a conventional Parallel Track Path (PTP) dual-layer optical disk.
Figure 3A:
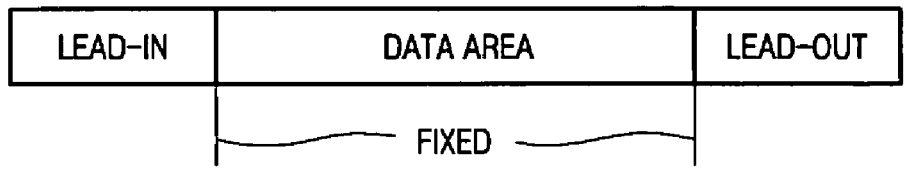
FIGS. 3A and 3B show the layouts of conventional recordable single- and dual-layer information storage media, respectively.
Figure 3B:
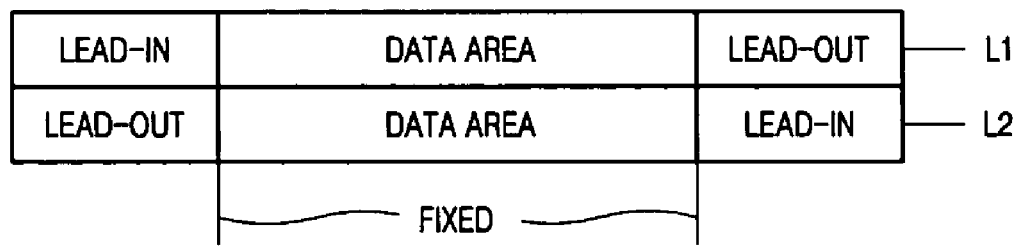
Figure 4:
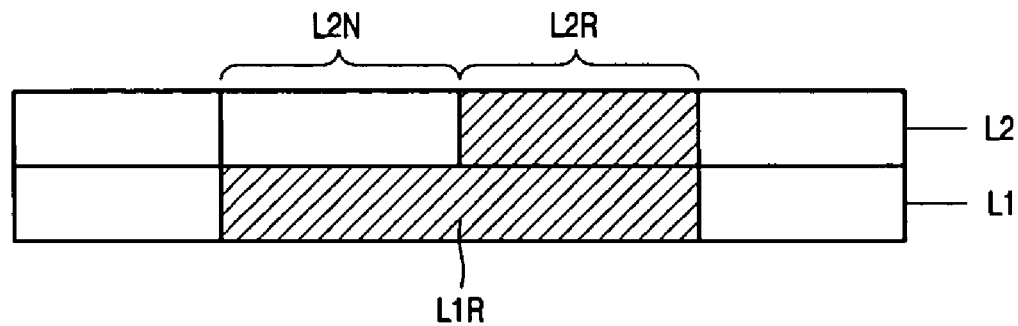
FIG. 4 shows a region on which a beam is incident when data is recorded on a portion of a conventional dual-layer information storage medium.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5A:
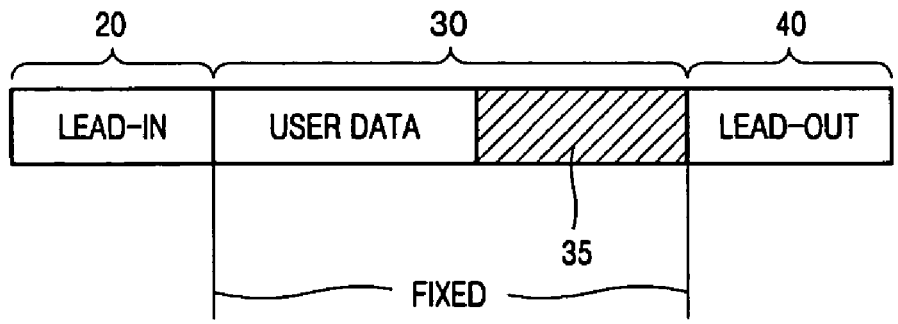
FIGS. 5A-5C show layouts of an information storage medium according to an embodiment of the present invention.

Referring to FIG. 5A, an information storage medium according to an embodiment of the present invention, includes one or more recording layers, each one or more recording layers including a lead-in area 20, a data area 30, and a lead-out area 40. Here, the locations and capacities of the lead-in and lead-out areas 20 and 40 are fixed according to an aspect of the invention. Furthermore, the data area 30 has a predetermined maximum recordable data capacity that is hereinafter called full capacity. When the amount of user data to be recorded on the data area is less than the full capacity of the storage medium, data other than the user data is recorded on a space 35 remaining on the data area 30 after the user data has been written.

Figure 5B:
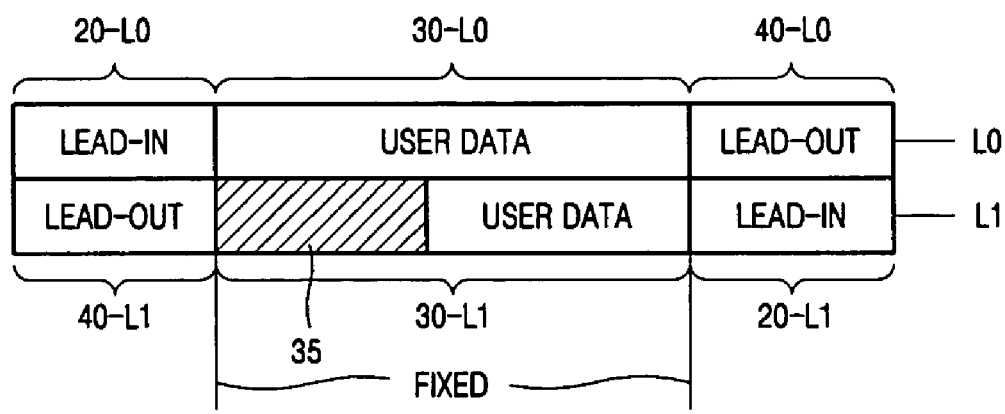
Figure 5C:
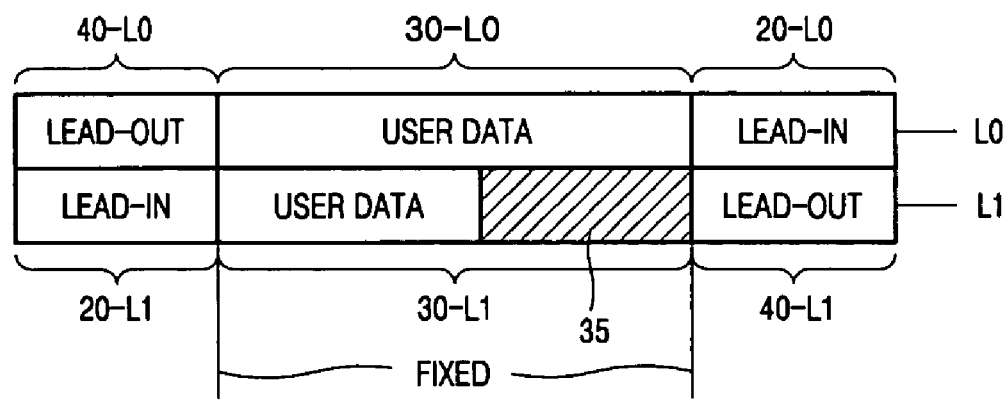

Alternatively, as shown in FIGS. 5B and 5C, the information storage medium includes a plurality of recording layers L0, L1, each layer containing a lead-in area 20-L0, 20-L1, a data area 30-L0, 30-L1, and a lead-out area 40-L0, 40-L1. Like the information storage medium of FIG. 5A, the locations and capacities of lead-in and lead-out areas 20-L0, 20-L1, 40-L0, 40-L1 on each layer L0, L1 are fixed. When the amount of user data to be recorded on the data area 30-L0, 30-L1 is less than the full capacity of the storage medium, a space 35 remains on a recording layer L0, L1, and data other than the user data may be recorded on the remaining space 35.

More specifically, FIG. 5B shows an Opposite Track Path (OTP) information storage medium having first and second recording layers L0 and L1 where a track spiral runs from the inner circumference of the medium to the outer circumference. FIG. 5C shows an OTP information storage medium where a track spiral runs from the outer circumference to the inner circumference. Although not shown in the drawings, the present invention may be applied to Parallel Track Path (PTP) information storage media as well as any OTP information storage media regardless of the direction of a track spiral. Moreover, it is understood that additional layers can be used.

The first and second recording layers L0 and L1 include lead-in areas 20-L0 and 20-L1, data areas 30-L0 and 30-L1, and lead-out areas 40-L0 and 40-L1, respectively. The locations and capacities of the lead-in areas 20-L0 and 20-L1 and lead-out areas 40-L0 and 40-L1 are fixed. When the amount of user data recorded is less than the full capacity, there remains the space 35 on the first or second recording layer L0 or L1 after the user data has been recorded. That is, when the user data is recorded on or read from either the first or the second recording layer L0 or L1, a recording layer L0, L1 that is recorded on or read last has the remaining space 35 on which data other than the user data is then recorded.

For example, dummy data or data needed for recording and/or reproducing the user data may be written to the space 35 remaining after the user data has been recorded. The meaningless dummy data may have a pattern of 00h or FFh or can be other data according to aspects of the invention. The data needed for recording and/or reproducing the user data may be test data, copy protection information, information on a position where recording of user data ends or other data used to manage recording and/or reproduction of data. The information on a position where recording of the user data ends may be recorded in a lead-in area, in particular, in a lead-in area of a recording layer where the user data is last recorded. More preferably, but not required, the same information may be recorded in a region 15 of lead-in area 20-L1 shown in FIG. 6B containing disk-related information.

Alternatively, a user data region containing the user data may be separated from a dummy data region containing the dummy data. In this case, it is possible to record information on a position where recording of the user data ends at the end of the user data region, and information on a position where recording of the dummy data starts at the beginning of the dummy data region.

By fixing the locations and capacities of the lead-in area and the lead-out area, consistency with other recordable information storage media can be achieved. In particular, the present invention can be usefully applied to small information storage media widely used for mobile applications since recording dummy data or data needed for reading and/or reproducing user data on a remaining space will not considerably affect the mastering time, unlike in the case of large capacity storage media. If dummy data or data needed for recording and reproducing the user data is recorded on the remaining space after the user data has been recorded as described above, data can be written to all portions of each recording layer on an information storage medium having a plurality of recording layers. Thus, it is possible to make reading conditions on each recording layer equal, thereby improving reading performance.

Figure 6A:
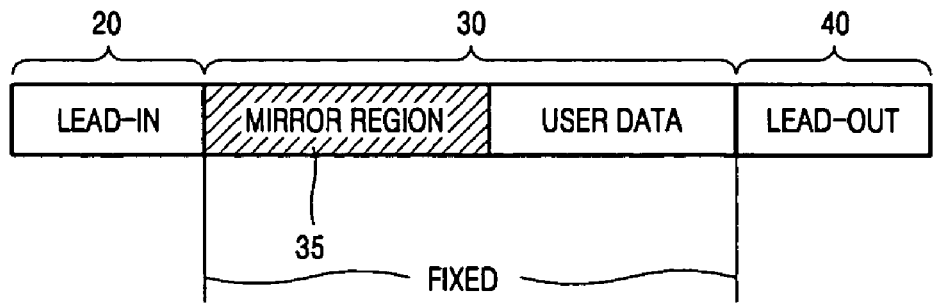
FIGS. 6A and 6B show other modified examples of the information storage medium according to an embodiment of the present invention.
Figure 6B:
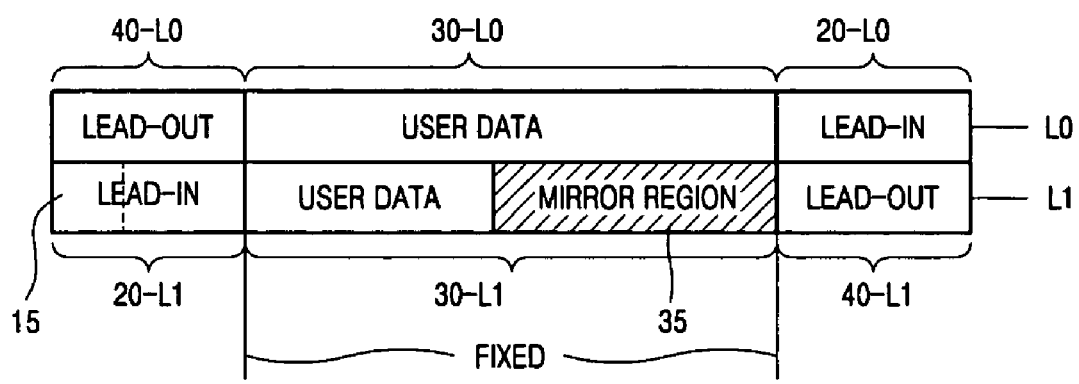

However, if it is disadvantageous in terms of production to record data other than the user data on the remaining space 35, the space 35 may be a mirror region as in the embodiment of the invention shown in FIGS. 6A and 6B.

Figure 7:
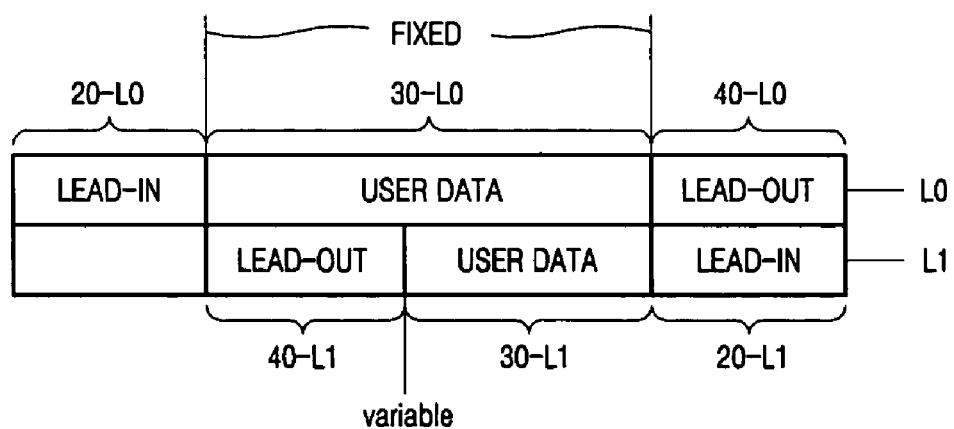
FIG. 7 shows the layout of an information storage medium according to another embodiment of the present invention.

As shown in FIG. 7, an information storage medium according to another embodiment of the present invention has a plurality of recording layers L0, L1. Each layer includes a lead-in area 20-L0, 20-L1, a data area 30-L0, 30-L1, and a lead-out area 40-L0, 40-L1. When an amount of user data recorded on the information storage medium is less than the full capacity of the storage medium, the lead-out area 40-L1 of a recording layer L1 that is read or recorded last is located at a space remaining on that recording layer L1 after all the user data is read or recorded. Thus, the location of a lead-out area 40-L1 of a recording layer L1 that is read or recorded on last among the plurality of recording layers is variable, but the locations and capacities of the other lead-in and lead-out areas 20-L0, 20-L1, 40-L0 are fixed.

Referring to FIG. 7, the information storage medium has first and second recording layers L0 and L1 containing lead-in areas 20-L0 and 20-L1, data areas 30-L0 and 30-L1, and lead-out areas 40-L0 and 40-L1, respectively. For example, when data is recorded on the first recording layer L0 and then on the second recording layer L1, the locations and capacities of the lead-in area 20-L0 and the lead-out area 40-L0 on the first recording layer L0 and the lead-in area 20-L1 on the second recording layer L1 are fixed, while the lead-out area 40-L1 is located at a space remaining on the second recording layer L1 after the user data has been recorded. If data is recorded or read starting from the second recording layer L1, the location of a lead-out area on the first recording layer L0 may vary. In this way, if the location of the lead-out area of a recording layer that user data is recorded on last varies, it is preferable, but not required, to record information about a position where user data recording ends in a lead-in area of the appropriate recording layer. More preferably, the same position information may be recorded in a region of the lead-in area containing disk-related information.

A method of recording information on a read-only information storage medium according to the present invention includes fixing locations of lead-in and lead-out areas and, when an amount of user data recorded is less than a full capacity of the storage medium, recording data other than the user data on a space left after the user data has been recorded or using the space as a mirror region. In this case, the data other than the user data may be dummy data or information about a position where recording of the user data ends. Alternatively, the method may include varying a location of a lead-out area of a recording layer that is recorded on or read last, among a plurality of recording layers, while fixing the locations of the other lead-in and lead-out areas.

Figure 8:
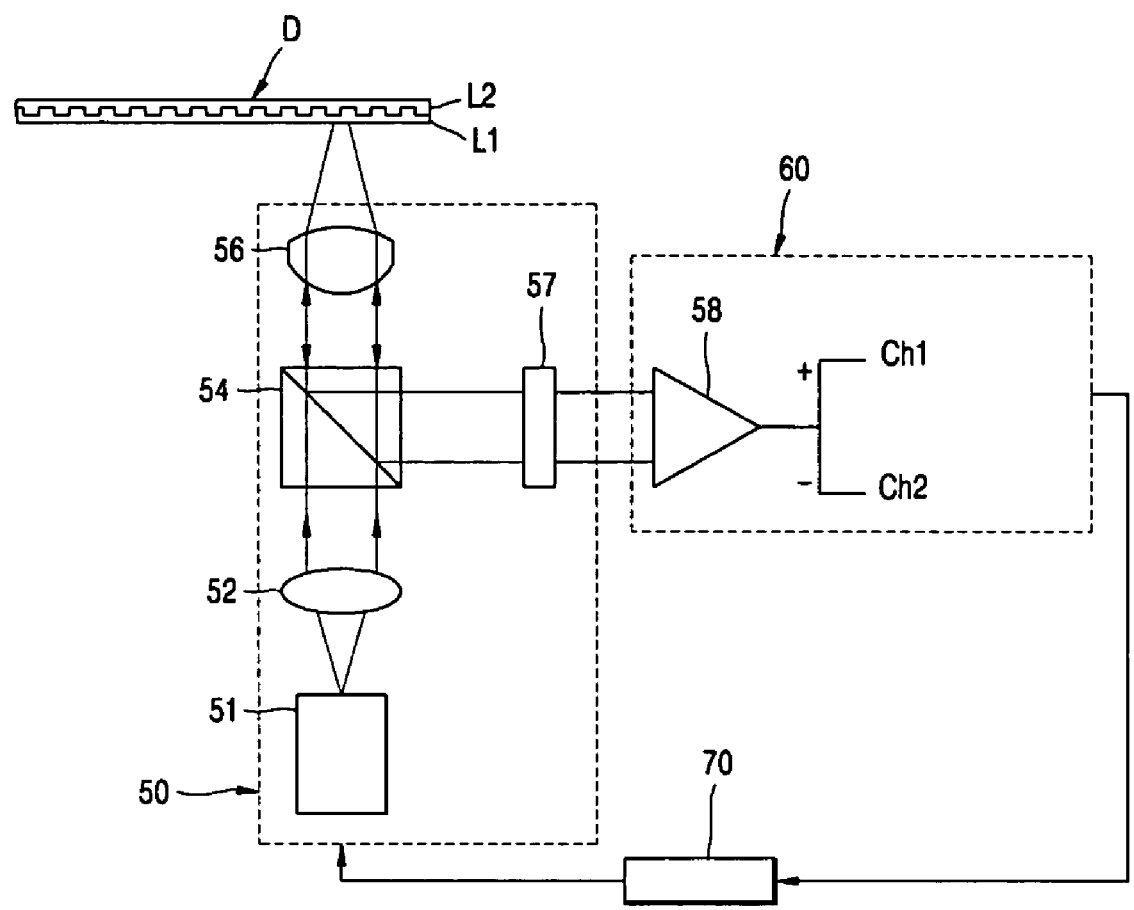
FIG. 8 is a schematic diagram of an apparatus for recording/reproducing data on/from an information storage medium according to an embodiment of the present invention.

FIG. 8 is a schematic diagram of an apparatus reproducing data from an information storage medium according to the present invention. The reproducing apparatus is a disk drive that includes a pickup 50, a reproducing signal processor 60, and a controller 70. More specifically, the reproducing apparatus includes a laser diode 51 that emits a laser beam, a collimating lens 52 that collimates the beam emitted from the laser diode 51 to ensure that the beam is parallel, a beam splitter 54 that converts the propagation path of an incident beam, an objective lens 56 that focuses the beam passing through the beam splitter 54 onto an information storage medium D, and a photodetector 57.

The beam reflected from the information storage medium D is reflected by the beam splitter 54 to the photodetector 57 (e.g., a quadrant photodetector). The beam received by the photodetector 57 and then passing through an operational circuit 58 is converted into an electrical signal and output as an RF or sum signal through channel Ch1 and as a push-pull signal through a differential signal channel Ch2.

The controller 70 allows the pickup 50 to fix locations and capacities of lead-in and lead-out areas and, when an amount of user data recorded on the storage medium is less than the full capacity of the storage medium, to record data other than the user data on a remaining space after the user data has been recorded or use the remaining space as a mirror region. The pickup 50 records dummy data on the remaining space or information on a position where recording of the user data ends or where recording of the dummy data starts. Alternatively, the controller 70 may allow the pickup 50 to vary the location of a lead-out area of a recording layer that is recorded on last, among a plurality of recording layers, while fixing the locations of the other lead-in and lead-out areas. In order to reproduce the recorded data, the beam reflected from the information storage medium D is incident on the photodetector 57 through the objective lens 56 and the beam splitter 54. A signal in the beam received by the photodetector 57 is then converted into an electrical signal by the operational circuit 58 and output as an RF signal.

An aspect of the present invention can be applied to a read-only information storage medium having one or more recording layers. As described above, an aspect of the present invention provides physical layouts of a read-only information storage medium. The layout of the information storage medium according to an aspect of the present invention is designed to include one or more recording layers, each layer containing a lead-in area, a data area, and a lead-out area, and when an amount of data recorded is less than a full capacity of the storage medium, to record data other than the user data on a remaining space of the storage medium or maintain the remaining space as a mirror region or a lead-out area. Thus, it is possible to be consistent in layout and reading conditions with other types of information storage media.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A read-only information storage medium having one or more recording layers, each layer containing a lead-in area, a user data area including user data, and a lead-out area, wherein locations of the lead-in and lead-out areas are disposed at a predetermined, fixed location, and since an amount of user data recorded on the storage medium is less than a full capacity of the storage medium, data other than the user data is recorded on a space remaining after the user data has been recorded in the user data area, and wherein information on a position where recording of the user data ends is recorded on the remaining space.

2. The medium of claim 1, wherein, the storage medium has multiple recording layers, the user data is sequentially recorded on the layers, and the remaining space is on the one of the recording layers on which the user data is recorded last.

3. The medium of claim 1, wherein information on a position where the recording of the user data ends is recorded in the lead-in area.

4. The medium of claim 3, wherein the information on a position where the recording of the user data ends is recorded in a region of the lead-in area containing disk-related information.

5. A read-only information storage medium having one or more recording layers, each layer containing a lead-in area, a user data area including user data, and a lead-out area, wherein locations of the lead-in and lead-out areas are disposed at a predetermined, fixed location, and since an amount of the user data recorded on the storage medium is less than a full capacity of the storage medium, a space remaining on the storage medium after the user data has been recorded is maintained as a mirror region.

6. A read-only information storage medium having a plurality of recording layers, each layer containing a lead-in area, a user data area including user data, and a lead-out area, wherein since an amount of the user data recorded on the storage medium is less than a full capacity of the storage medium, a location of the lead-out area of a recording layer on which the user data is recorded last is variable while locations of the other lead-in and/or lead-out areas are fixed in corresponding predetermined areas.

7. The medium of claim 6, wherein information on a position where recording of the user data ends is recorded in the lead-in area of the recording layer that the user data is recorded last.

8. A method of transferring data with respect to a read-only information storage medium having one or more recording layers, each layer containing a lead-in area, a user data area, and a lead-out area, the method comprising:
    fixing locations and capacities of the lead-in and lead-out areas; and
    when an amount of user data recorded on the storage medium is less than a full capacity of the storage medium, recording data other than the user data on a remaining space after the user data has been recorded or maintaining the remaining space as a mirror region and
    wherein information on a position where recording of the user data ends is recorded on the remaining space.

9. The medium of claim 6, wherein information on a position where the recording of the user data ends is recorded in the lead-in area.

10. The medium of claim 9, wherein information on a position where the recording of the user data ends is recorded in a region of the lead-in area containing disk-related information.

11. The method of claim 8, further comprising recording dummy data on the remaining space.

12. The method of claim 8, further comprising recording on the remaining space information on a position where recording of the user data ends.

13. The method of claim 11, further comprising recording on the remaining space information on a position where recording of the dummy data starts.

14. The method of claim 8, further comprising recording in the lead-in area information on a position where the recording of the user data ends.

15. The method of claim 14, further comprising recording in a region of the lead-in area containing disk-related information, information on a position where the recording of the user data ends.

16. A read-only information storage medium, comprising:
    a recording layer containing a lead-in area, a user data area, and a lead-out area, wherein a location of the lead-out area is variable and is determined based on a remaining space after user data has been recorded in the user data area.

17. The medium of claim 16, wherein the storage medium has multiple recording layers, the user data is sequentially recorded on the recording layers, and the remaining space is on the one of the recording layers on which the user data is recorded last.

18. The medium of claim 16, wherein dummy data is recorded on the remaining space.

19. The medium of claim 16, wherein information on a position where recording of the user data ends is recorded on the remaining space.

20. The medium of claim 18, wherein information on a position where recording of the dummy data starts is recorded on the remaining space.

21. The medium of claim 16, wherein information on a position where the recording of the user data ends is recorded in the lead-in area.

* * * * *